May 28, 1957  W. G. SIMPSON  2,793,439
MEASURING APPARATUS FOR BOOTS AND SHOES
Filed Aug. 15, 1951  5 Sheets-Sheet 1
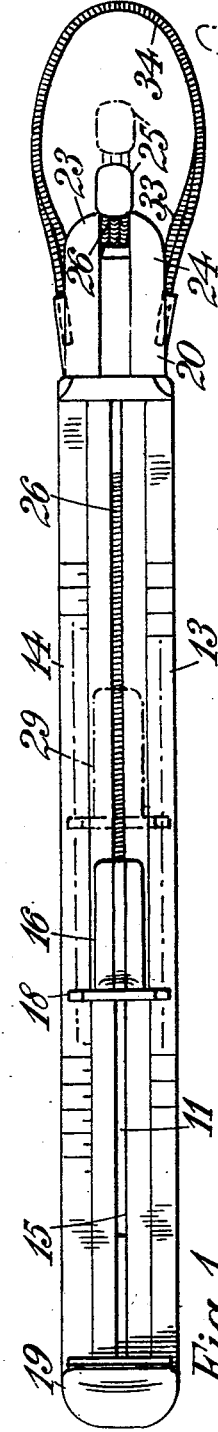
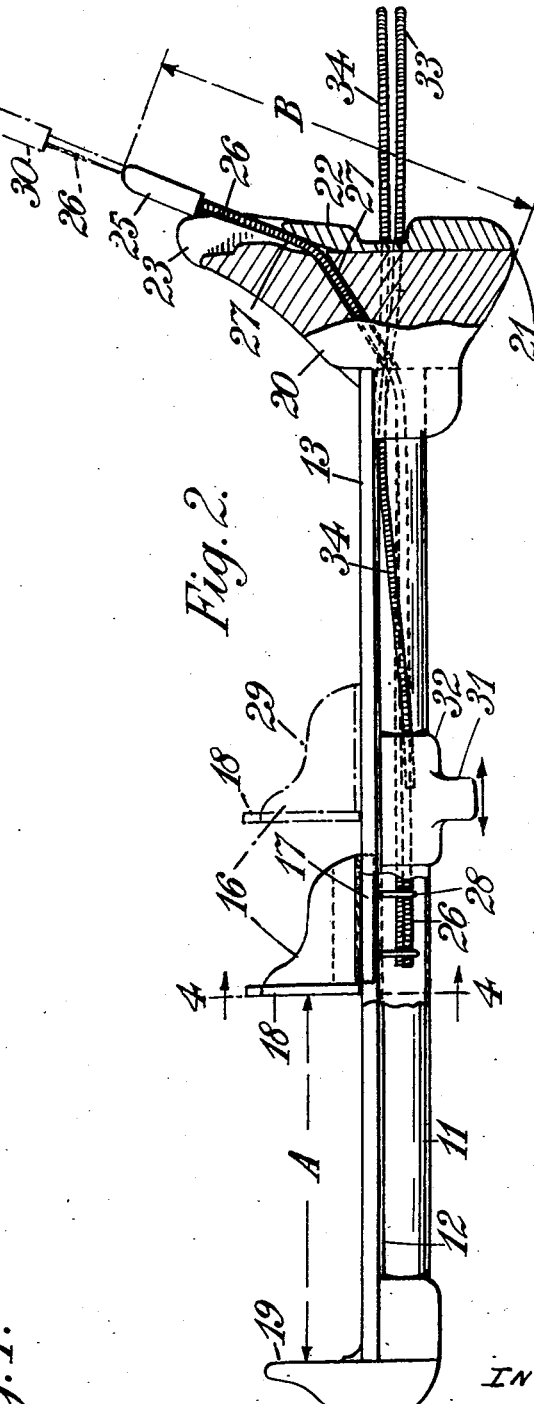
INVENTOR:
WILLIAM G. SIMPSON May 28, 1957 W. G. SIMPSON 2,793,439
MEASURING APPARATUS FOR BOOTS AND SHOES
Filed Aug. 15, 1951 5 Sheets-Sheet 2
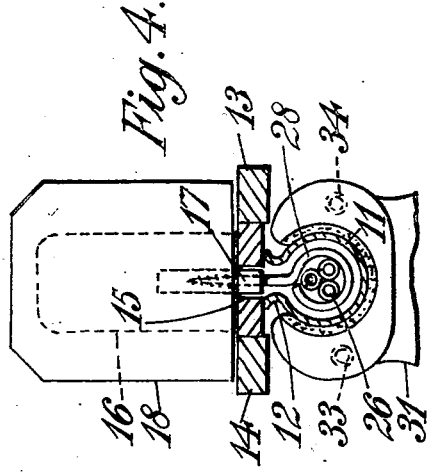
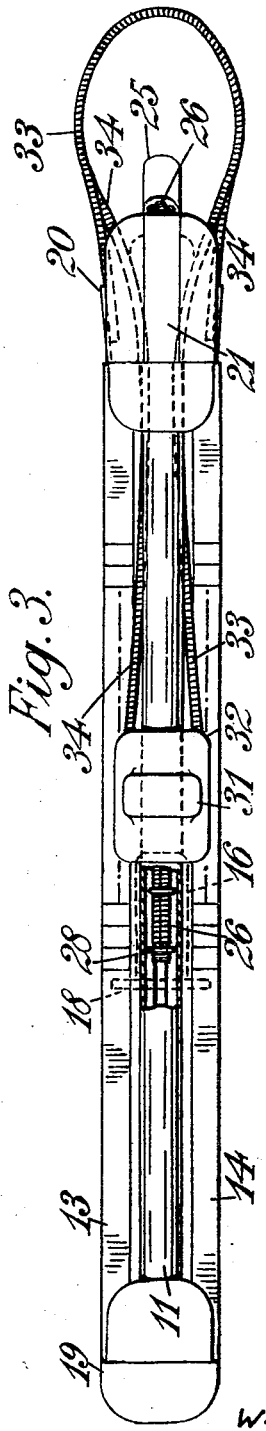
INVENTOR:
WILLIAM G. SIMPSON
By Young, Emery + Thompson
Attys.

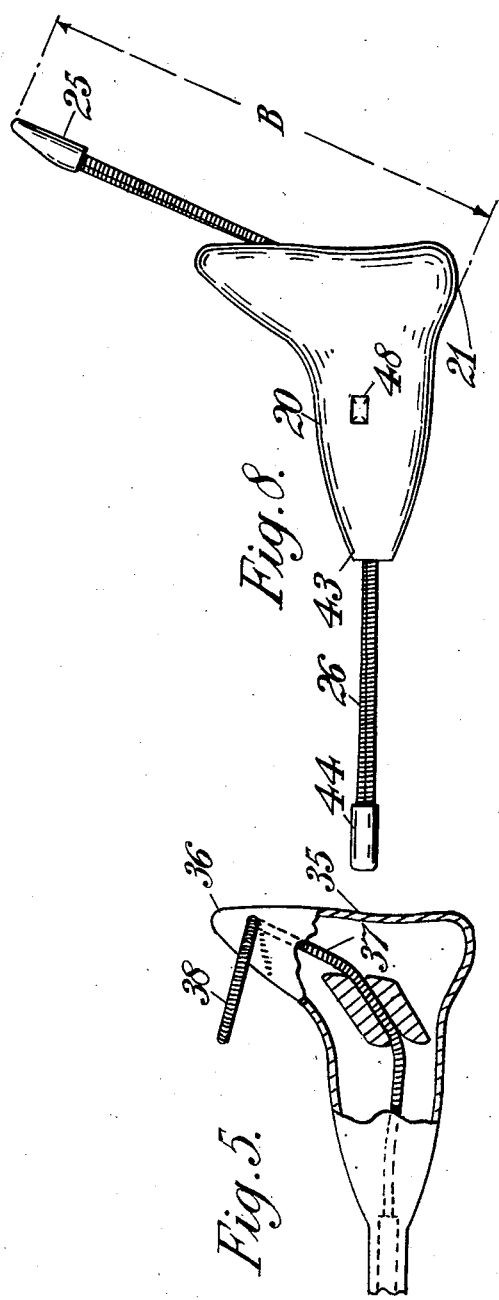

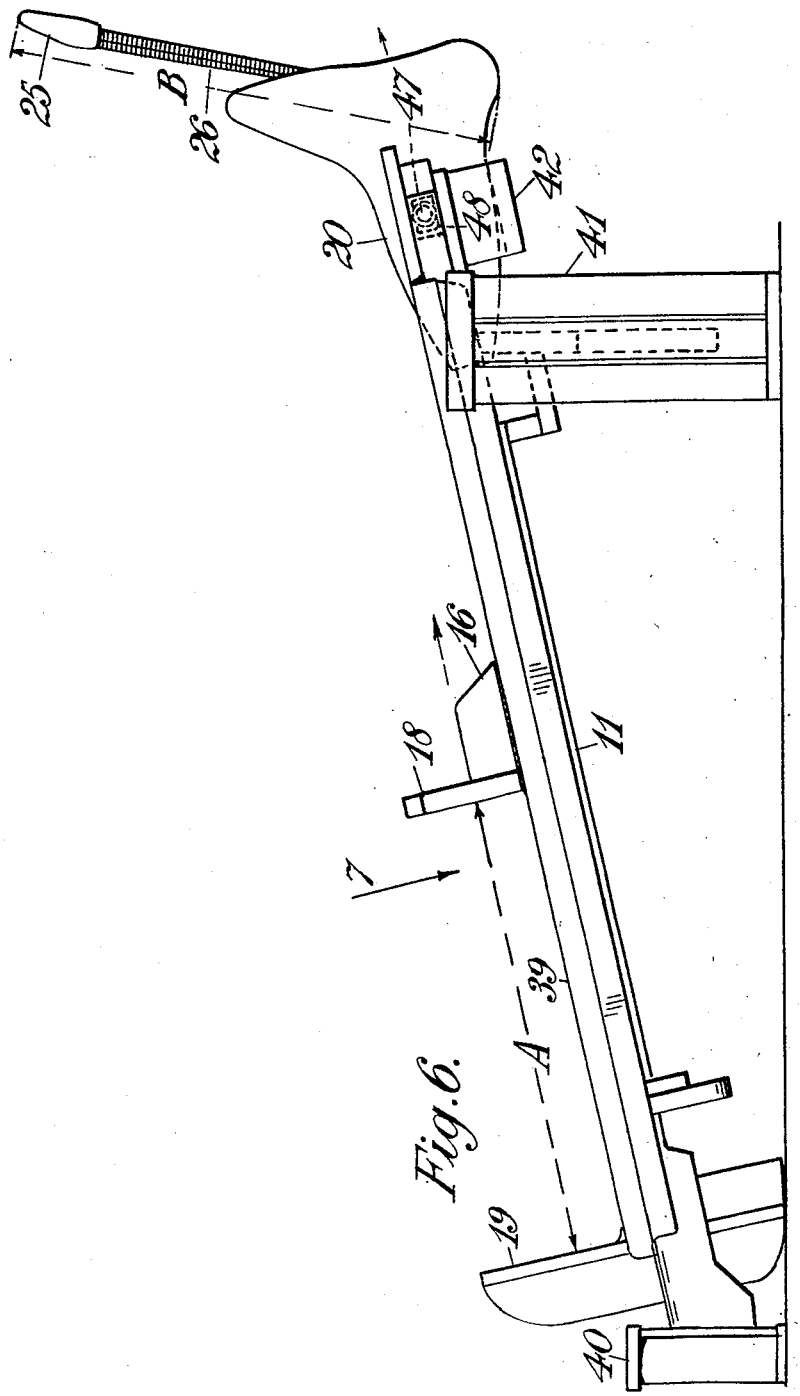

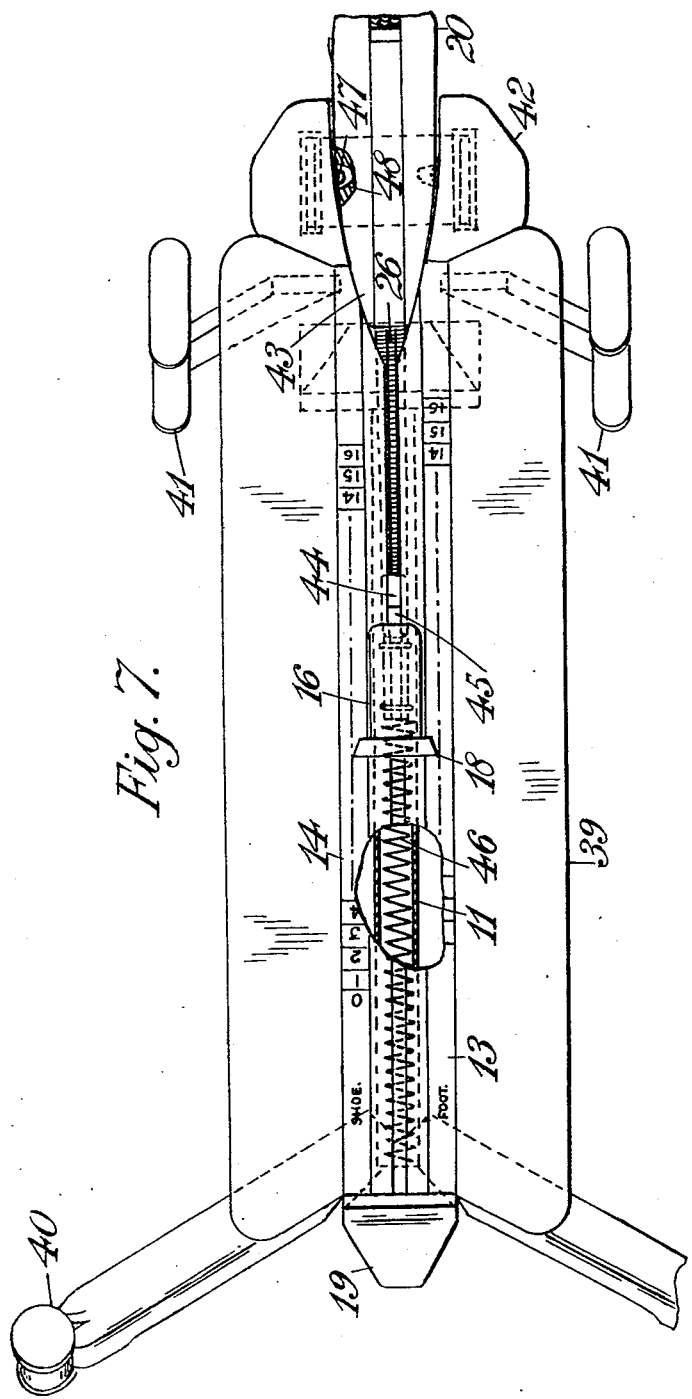

United States Patent Office 2,793,439
Patented May 28, 1957

2,793,439

MEASURING APPARATUS FOR BOOTS AND SHOES

William Gordon Simpson, Harpenden, England, assignor to Lilian Margot Jeffery, Harpenden, England Application August 15, 1951, Serial No. 241,939

13 Claims. (Cl. 33—3)

This invention comprises improvements in or relating to measuring apparatus for boots and shoes.

It is known to provide a measuring device comprising a scale to show the size of the shoe, an abutment at one end of the scale to be engaged by the heel of the person being fitted and a slider on the scale to engage the toe, so that the size of shoe required can be determined by measuring the length of the wearer's foot; such a device will hereinafter be referred to as a measuring apparatus of the known kind described.

According to the present invention, in a measuring apparatus for boots and shoes there are provided parts with foot engaging surfaces adjustable relatively to one another to fit different persons' feet, and shoe engaging surfaces also adjustable relatively to one another to fit different sizes of shoe and operatively connected to, or otherwise related with, the foot engaging surfaces in such manner that when the foot engaging surfaces are adjusted to fit a wearer's foot the shoe engaging surfaces are thereafter capable of adjustment, or are simultaneously adjusted automatically, to fit a shoe which is the correct size for that foot and vice versa.

According to a feature of the invention, in apparatus of the known kind described, at one end of the scale there is provided a heel piece adapted to fit into the heel of a shoe, and in association with this heel piece there is a toe piece which is movable with respect to the heel-piece and is operatively connected to the slider in such a manner that the over-all distance from the end of the toe piece to the end of the heel piece always corresponds to the internal length of the shoe which will fit upon a foot to which the slider has been adjusted.

In a preferred construction the heel piece is shaped somewhat like the heel-portion of a last and is set with the sole substantially at right angles to the scale, so that the position of the scale corresponds approximately to that of the supporting pillar or stem of a last, while the toe-piece is connected to the slider by a flexible cable, constituted by a length or lengths of inextensible close-coil spring-rod passing through the heel-piece and along the scale, the spring-rod being guided within the heel piece in a curved or bent path so that the toe piece moves in a direction transverse to the movement of the slider towards or away from the heel piece. Obviously with this arrangement the movement of the toe piece will be equal to the movement of the slider and if the parts are so proportioned that the over-all distance from the end of the toe piece to the end of the heel piece is in one position equal to or a little greater than the measured length of the wearer's foot, the same will be true in every other position to which the slider and toe piece may be moved.

In this way it is possible for the end of the apparatus which comprises the heel and toe pieces, after having been set to the size of a person's foot, to be inserted into any shoe and if it is found that they fit therein then it is known that that shoe will be the correct length. Obviously in making the parts any appropriate allowance for end room within the shoe can be provided for.

According to a further feature of the invention, there is provided apparatus for measuring the girth of a person's foot and the corresponding internal girth of the shoe which is to be tried on. This girth measurement apparatus may be either incorporated in the apparatus for measuring the length of the person's foot or may be separate as desired.

Various forms of apparatus in accordance with the invention will now be described by way of example, and with reference to the accompanying drawings in which:

Figure 1 is a plan view of one form of apparatus,

Figure 2 is a side elevation of the same apparatus, partly in section,

Figure 3 is an underplan view of the same apparatus, partly in section,

Figure 4 is a cross-sectional elevation on the line 4—4 of Figure 2,

Figure 5 is a side elevation of part of a further form of apparatus,

Figure 6 is a side elevation of a still further form of apparatus,

Figure 7 is a plan view of the apparatus of Figure 6 in the direction of the arrow 7, and Figure 8 is a view of a part of the apparatus of Figures 6 and 7.

Referring firstly to Figures 1 to 4, an apparatus is provided which consists of a stem portion comprising a plated metallic tube 11 to act as the main framework. This tube 11 is slotted all along the top and has flanges 12 standing up from the slot on each side which are outwardly bent at their upper edges so as to lie flat. Along the flat portions of said flanges 12 there lie scale members 13, 14 each marked in dimensions corresponding to the size either of a shoe or of a foot. The two scale members 13, 14 are spaced apart from one another so as to provide a parallel opening 15 between them above the slot in the tube 11, and the opening 15 accommodates a guide member 17 for a slider 16 which is capable of sliding to and fro along the scales, the scales constituting guides for the slider. The slider 16 is provided with an upstanding pallet 18 at right angles to the scales 13, 14 and facing towards the end thereof which corresponds to the smaller sizes of shoe. At the end of the scales 13, 14 there is secured an upstanding heel-engaging portion 19 and if the heel of a person is placed against the heel-engaging portion and the slider 16 is moved up to the end of the person's foot the scales 13, 14 will show, upon one of them the length of the foot and upon the other the corresponding size of shoe required. The heel-engaging portion 19 also serves to unite the scales 13, 14 and the metal tube 11 at that end.

At the opposite end of the scales 13, 14 from the heel-engaging portion 19, the scales and the tube 11 are united by a last-shaped member 20 having a heel piece 21 at one end and a sole 22 which is substantially at right angles to the scales 13, 14. The size of this member 20 is approximately that of the inside of the smallest size of shoe made, and at the toe-end it is bifrucated, that is to say comprises two sides 23, 24 which are spaced apart from one another sufficiently to receive between them a movable toe piece 25. When the slider 16 is moved towards the heel-engaging portion 19 so that it corresponds in position to the smallest size of shoe available the toe piece 25 at the other end of the apparatus will be partly accommodated in the space between the two sides 23, 24 of the last-shaped member 20. This toe piece 25 is connected to the slider 16 by three parallel lengths of resiliently-flexible inextensible spring-rod or cable, formed from close-coiled wire and similar to that not infrequently used for stretching across windows to hang curtains thereat. The three lengths of spring-rod 26 are secured together at one end in the toe piece 25 and are led through passages 27 in the member 20 into the end of the tube 11, and thence along the tube, beneath the scales 13, 14, to the slider 16 to which they are secured at their other ends by means of eye-pins 28. If the slider 16 is drawn back from the minimum position the spring-rods 26 will transmit the slider's movement to the toe piece 25 and the toe piece will be pushed out from the last-shaped member 20, which comprises the heel piece 21, to an extent exactly corresponding with the distance through which the slider is withdrawn from the heel-engaging portion 19. In Figures 1 and 2, alternative positions of the slider 16 and toe piece 25 are shown in broken line at 29 and 30 respectively.

The over-all distance B from the end of the heel piece 21 to the end of the toe piece 25 is equal to the distance A between the heel-engaging portion 19 and the platen 18 of the slider 16, plus the normal clearance provided in the length of a shoe in relation to the length of the wearer's foot for a comfortable fit; thus when the slider has been adjusted to a person's foot, the last-shaped member 20 comprising the heel piece 21, and the toe-piece 25, will just fit snugly inside a shoe of a length to suit that foot, and moreover the sizes of both foot and shoe will be indicated on the scales 13, 14.

It will be seen that the pasages 27 through the member 20 are such that the spring rods 26 bend through a total angle of about 60° in passing therethrough; when the member 20 and the toe piece 25 are fitted into a shoe the parts are so proportioned that the rods 26 become further bent until the angle between that part of the rods extending along the tube 11 and the part emerging from the member 20 is practically a right angle, and this ensures that, while the rods 26 may normally be fairly readily slid through the passages 27 for adjustment of the apparatus, the greater degree of bending when the parts 20 and 25 are fitted inside a shoe increases the forces resisting sliding and thereby assists in preventing error arising through accidental movement of the parts after adjustment.

The apparatus also incorporates a device for girth measurement. This comprises a second slider 31 disposed beneath the scales 13, 14 to slide along the tube 11, the slider having a base portion 32 which embraces the tube. A pair of spring-rods 33, 34 similar to the rods 26, have their ends secured to the slider 31 one on each side of the tube 11, and the spring-rods extend along the tube toward the last-shaped member 20 and pass through passages therein, emerging one at each side of the sole 22 of said member 20. Beyond the last-shaped member the rods 33, 34 are looped round in opposite directions and their ends are secured to opposite sides of the member 20, the end of the rod 33 being close to the place of emergence of the rod 34 from the member 20 and vice versa. In this manner a composite loop or girth band is formed arising from the member 20, the size of which may be adjusted as desired by moving the slider 31 along the tube 11, and by placing a person's foot so that the sole of the foot lies against the sole 22 of the member 20 and tightening the girth band around the foot by means of the slider 31, a setting of the device for that particular foot may be obtained. Scale markings are provided along the under surfaces of the scales 13, 14 to give an indication of both the girth of the foot measured and the corresponding internal measurement of a shoe to suit that foot.

For obtaining an indication of the interior girth measurement of a shoe a separate special girth band for the shoe is used in conjunction with the girth band for the wearer's foot already described, and in Figure 5 there is shown the end part of an apparatus bearing such a special shoe girth band. As before, the apparatus has a stem portion bearing a scale along which a slider (not shown) can be moved, and at one end of the scale is a last-shaped member 35 small enough to fit inside the smallest shoe to be measured and leave room to spare above the toe end 36 of the last-shaped member. A spring-rod 37 has its ends secured to the slider and extends from the slider in a direction parallel to the scale toward the last-shaped member 35, and then through the last-shaped member to a place near the toe end 36 thereof where it emerges from one side of the toe and is led around in a loop 38 above the toe to the other side of the toe where it again enters the member 35 and returns through said member and along the scale back to the slider in a path parallel to its original path when leaving the slider. Thus adjustment of the slider along the scale will cause variation in the size of the loop or girth band 38. The scale bears graduations corresponding to graduations upon one of the scales traversed by the slider controlling the foot girth band afore described, and in operation, after a girth setting has been obtained with the foot girth band, the slider of the shoe girth band 38 is moved to a position on its scale corresponding to the setting of the slider of the foot girth band; the last shaped member 35 and shoe girth band 38 thereon will then fit snugly inside a shoe having a girth to suit the foot from which the original setting was obtained.

It will be realized that, as a further construction, it is possible to incorporate a foot girth band, and a shoe girth band similar to that illustrated in Figure 5, in the same unit, and to couple up both bands to a single common slider in such manner that as the measurement of a person's's foot is taken by means of the foot girth band the shoe girth band is simultaneously set automatically to the internal measurement of a shoe to fit the foot.

Figures 6, 7 and 8 illustrate an apparatus generally similar in its construction and operation to the length measurement part of the apparatus described with reference to Figures 1 to 4, but intended to stand upon the floor of retail premises selling shoes. Parts equivalent to parts already described with reference to Figures 1 to 4 are given like reference numbers. In this construction the scales 13, 14 are broadened out at each side of the stem portion to afford a wide platform 39 which is supported, inclined to the horizontal, upon a pair of short legs 40 at one end and a pair of longer legs 41 at the other. The last-shaped member 20 of this apparatus is not united to the scales 13, 14 and the tube 11 as in the case of the first described construction, but together with the spring-rods 26 and toe piece 25 it forms a removable unit, clearly shown in Figure 8. When in position on the apparatus the last-shaped member 20 rests in a cradle 42 secured to the end of the platform 39, with its inner end or nose 43 in alignment with the end of the tube 11 beneath the platform so that the rods 26 emerging through the nose 43 may extend into the tube 11 toward the slider 16. The inner ends of the spring-rods 26 are not directly attached to the slider but are united by an abutment member 44 to bear against a co-operating abutment 45 carried by the slider within the tube 11, and the abutments 44, 45 are normally kept in contact with one another by a helical compression spring 46 within the tube 11 which urges the slider 16 toward the end of the platform 39 at which the cradle 42 supporting the last-shaped member 20 is situated. The last-shaped member 20 is held in position in the cradle by means of a pair of spring-urged balls 47 disposed at opposite sides of the cradle 42 and engaging in co-operating recesses 48 in the sides of the member 20.

To operate the apparatus an assistant adjusts the position of the slider 16 to correspond to the length of a person's foot by moving the toe piece 25 thereby using the spring-rods 26 as operating rods for the slider. When the setting has been obtained, the last-shaped member 20 and toe piece 25 may be removed from the remainder of the apparatus for convenience in checking the internal sizes of shoes.

If desired, the sides of the last-shaped member 20 may be provided with rubber or spring inserts in order to facilitate the introduction of the member into shoes of small size. The apparatuses described herein are preferably fabricated largely from synthetic plastic materials.

In the device for the measurement of foot and shoe length, the scale of shoe sizes marked will naturally correspond to the scale normally employed in the particular country in which the apparatus is to be used, but it will be seen that, if desired, there is in fact sufficient room for four scales side-by-side so that it is possible to produce a "universal" model bearing graduations corresponding to British, U. S., and Continental scales of shoe sizes.

I claim:

1. Apparatus for determining the correct size footwear for a wearer's foot, comprising a framework, adjustable foot-engaging means mounted at one position upon the framework for gauging a dimension of a wearer's foot, adjustable shoe-interior engaging-means mounted at a different position upon the framework for gauging the corresponding internal dimension of a shoe and operative connections extending along the framework between the foot-engaging means and the shoe-interior engaging-means such that when the foot-engaging means is set to fit a wearer's foot, the shoe-interior engaging means is automatically set simultaneously to fit the interior of a shoe of the correct size for that foot.

2. Apparatus for determining the correct size of shoe for a wearer's foot, comprising a framework, adjustable foot-engaging means mounted at one position upon the framework for gauging a dimension of a wearer's foot, adjustable shoe-interior engaging-means mounted at a different position upon the framework for gauging the corresponding internal dimension of a shoe and a cable connection extending along the framework between the foot-engaging means and the shoe-interior engaging means, the arrangement being such that when the foot engaging means is set to fit a wearer's foot, the shoe-interior engaging-means is automatically set simultaneously to fit the interior of a shoe of the correct size for that foot.

3. Apparatus for determining the correct size footwear for a wearer's foot, comprising a framework, adjustable foot-engaging means mounted at one position upon the framework for gauging a dimension of a wearer's foot, adjustable shoe-interior engaging-means mounted at a different position upon the framework for gauging the corresponding internal dimension of a shoe, said shoe-interior engaging-means having a portion shaped like the heel part of a last to fit into the heel end of the shoe upper and a toe-engaging part adjustably mounted thereon, and a cable connection extending along the framework between the foot-engaging means and the shoe-interior engaging means, the arrangement being such that when the foot-engaging means is set to fit a wearer's foot, the shoe interior engaging means is automatically set simultaneously to fit the interior of a shoe of the correct size for that foot.

4. Apparatus for determining the correct size of footwear for a wearer's foot, comprising a stem portion along which the foot is to rest, a heel-stop on one end of the stem portion against which the heel of the foot is to be placed, a slider slidable along the stem portion toward and away from the heel-stop and constituting a toe-stop for moving up to the toe end of a foot, a last-shaped portion similar to the heel part of a last on the other end of the stem portion shaped to fit inside the heel end of a shoe upper, a resilient cable secured at one end to the slider which cable passes along the stem portion toward the last-shaped portion and through a passage in said last-shaped portion, emerging at the toe end thereof, and a toe piece fixed upon the other end of said cable so as to be movable toward and away from the last-shaped portion as the slider is moved along the stem portion, the arrangement being such that when the slider is moved in relation to the heel-stop to a position which represents the length of a wearer's foot, the toe piece is automatically caused to take up a position in relation to the last-shaped portion in which the last-shaped portion and the toe piece together are a close fit as regards length, within a shoe of the correct length for the foot.

5. An apparatus as claimed in claim 4 wherein the last-shaped portion is set so that the sole thereof is substantially at right-angles to the direction of movement of the slider along the stem portion, the position of the stem portion corresponding approximately to that of the support pillar of a last, and the cable is guided within the last-shaped portion in a curved path so that the toe piece moves with respect to the last-shaped portion in a direction transverse to the direction of the slider.

6. An apparatus as claimed in claim 5 wherein the passage through the last-shaped portion for the cable is so formed that the angle through which the cable is normally curved by passing through said passage is less than the angle through which it must be curved when the last-shaped portion and toe piece are fitted properly within a shoe.

7. Apparatus as claimed in claim 6, wherein the cable is constituted by parallel lengths of resiliently-flexible inextensible spring-rod made from close-coiled wire.

8. An apparatus as claimed in claim 4, wherein the stem portion bears two sets of graduations to be traversed simultaneously by the slider, one to indicate the measurement of a foot and the other the measurement of the shoe which will fit the foot.

9. An apparatus as claimed in claim 4, wherein an adjustable foot-girth-band is mounted on the stem portion, said girth-band being in the form of a loop of flexible material to encircle the foot, which loop is adjustable in size to fit closely around different persons' feet, a slider slidable along the stem portion is operatively connected to the girth-band so that movement of the slider adjusts said band, and a scale indicating the girth measurement is provided on the stem portion, which scale is traversed by the slider.

10. Apparatus as claimed in claim 9 in combination with shoe girth gauging means, comprising a shoe-girth-band carrying member in the shape of a last and having a stem portion and a part to fit inside a shoe, an adjustable shoe girth-band mounted on the last-shaped carrying member, said shoe girth-band being in the form of a loop of flexible material to fit around the internal girth of a shoe, which loop is adjustable in size to fit closely within different shoes, a slider slidable along the stem part of the carrying member operatively connected to the shoe girth-band so that movement of the slider adjusts said band, and a scale indicating girth measurement provided on said stem part, which scale is traversed by the slider.

11. Apparatus as claimed in claim 10 wherein the girth-bands are formed from lengths of resiliently flexible inextensible spring-rod made of close-coiled wire.

12. Apparatus as claimed in claim 4 wherein the last-shaped portion and associated toe piece are removable as a unit from the stem portion, releasable locking means being provided associated with the last-shaped portion and the stem portion to locate and hold the last-shaped portion normally in its correct position at the end of the stem portion, and the cable between the toe piece and slider has an abutment member at its end nearer the slider to bear upon a cooperating abutment carried by the slider, with spring means acting upon the slider to urge the abutments normally into contact with one another.

13. A device for comparing shoe length with foot length comprising a frame, two heel stops including a shoe heel stop and a foot heel stop on said frame, and an elongated length determining slide on said frame having the opposite ends thereof movable relatively toward and away from said heel stops, one of said slide ends and said shoe heel stop determining the shoe length and the other slide end and said foot heel stop establishing a similar length along said frame for direct comparison with the foot length.

References Cited in the file of this patent

UNITED STATES PATENTS

| | | |
|---|---|---|
| 2,326,820 | Bliss | Aug. 17, 1943 |
| 2,480,725 | Gilbert | Aug. 30, 1949 |
| 2,672,688 | Crandall et al. | Mar. 23, 1954 |

FOREIGN PATENTS

| | | |
|---|---|---|
| 81,636 | Germany | Sept. 18, 1894 |
| 651,581 | Germany | Oct. 15, 1937 |
| 727,752 | Germany | Nov. 11, 1942 |